E. FULDA.
CLIP DEVICE FOR REELS.
APPLICATION FILED JULY 12, 1920.
1,421,933.
Patented July 4, 1922.
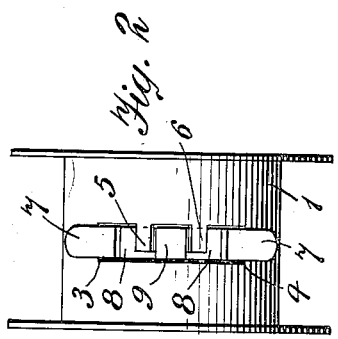
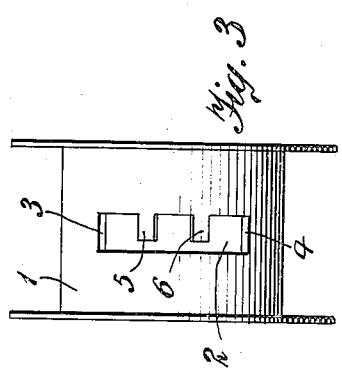
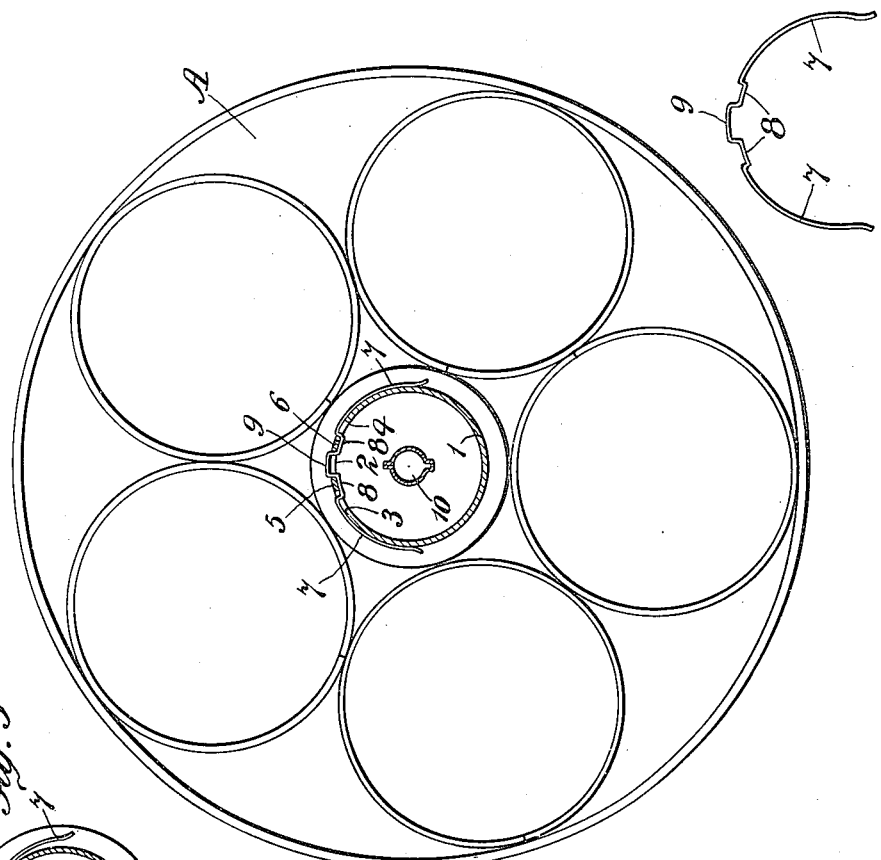
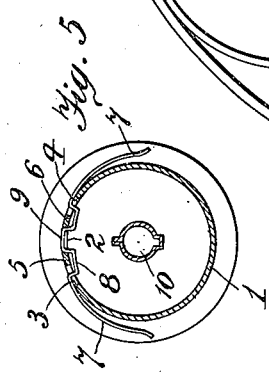
Inventor
EDWARD FULDA
By his Attorneys

UNITED STATES PATENT OFFICE.

EDWARD FULDA, OF NEW YORK, N. Y.

CLIP DEVICE FOR REELS.

1,421,933.    Specification of Letters Patent.    Patented July 4, 1922.

Application filed July 12, 1920. Serial No. 395,616.

*To all whom it may concern:*

Be it known that I, EDWARD FULDA, a citizen of the United States, and a resident of New York, in the county of New York and State of New York, have invented certain new and useful Improvements in Clip Devices for Reels, of which the following is a specification.

My present invention relates to a clip device for reels and is particularly useful for motion picture film reels.

The object of the invention is to facilitate the operation of securing the inner end of the film to the hub or drum of the reel.

Heretofore in all types of reels for motion picture films of which I am aware it has been the custom to secure the end of the film to the reel hub or drum by a spring clip. In order to get the end of the film under the clip the operator lifts up the end of the spring with his finger, slips the film under it and then quickly lets the spring snap back on the film by withdrawing his finger. In the first place this is very awkward and slow. Then again it tends to injure the finger. And again, it consumes considerable time to properly adjust the film as withdrawing the finger from the clip tends to disturb the position of the film.

All the above objections are obviated by my invention and in a very simple, efficient manner.

The invention consists in the novel construction and arrangement of spring clip as hereinafter more particularly described and then specified in the claims.

In the accompanying drawings, Fig. 1 is a transverse cross-section through the hub or drum of a reel designed for moving picture film and having my invention applied thereto.

Fig. 2 is a side elevation of the hub showing a spring clip construction applied thereto in accordance with this invention.

Fig. 3 is a similar view of the hub, the spring clip being removed.

Fig. 4 is an edge view of a spring clip according to this invention.

Fig. 5 is a cross-section through the hub similar to Fig. 1 but showing the clip in extended position to permit the insertion of the film end under it.

The invention is associated with the hub or drum of the reel and may be used with any reel construction, the type of side plates or members or the particular kind of hub or drum being immaterial.

In the drawings, A typifies a side member of the reel of any desired construction. As will be understood there are two of these side members, one at each end of the hub or drum 1. In the drawings the hub is shown as a sheet metal cylinder.

The hub or drum 1 is provided with a slot or depression 2 formed circumferentially around its periphery. 3, 4 indicate shoulders representing in the illustrated case the ends of the slot or depression.

5 and 6 indicate tongues or fingers integral with the hub 1 and projecting transversely and partially across the slot 2.

7 indicates a spring clip the free ends of which wrap partially around the hub or drum 1 and normally press against the periphery thereof. A portion of the body of the clip intermediate the ends is located in the slot 2 and is held to the drum by interlacing it under the fingers 5 and 6 by offsetting portions 8 of the clip.

The clip between the fingers 5 and 6 is preferably provided with a thumb-piece 9 which preferably projects slightly above the outer surface or periphery of the drum 1.

When a sheet metal drum as shown is employed it is also provided with the usual sleeve 10 for the supporting spindle.

In the operation of the device, a downward pressure on the thumb-piece 9 or on any part of the clip between the shoulders 3 and 4 will cause the free ends of the clip to rise away from the surface of the drum as shown in Fig. 5. In doing this, the clip fulcrums on the shoulders 3 and 4. When the clip ends are raised the end of the film can be slipped readily under either of them as desired and upon releasing the pressure the tension of the clip causes the ends to snap back toward the drum and securely hold the film thereto.

In the construction shown the clip is readily and quickly secured in place, merely by slipping it sidewise under the fingers 5 and 6 and may be just as readily replaced when broken or damaged.

What I claim as my invention is:—

1. In a reel, the combination with the hub or drum, of a spring clip of sheet metal held to said hub by fingers projecting across a circumferentially extending depression at the surface thereof and adapted to raise its free end upon the application of a downward pressure to another part of the clip.

2. In a reel, the combination with the hub or drum, of a spring clip of sheet metal mounted on the periphery of said hub by a tongue integral therewith and a thumb-piece on said clip adapted on a downward pressure to raise the free end of the clip away from the hub.

3. In a reel, the combination with a sheet metal hub or drum having a slot in its periphery, and a tongue integral therewith and extending partially across said slot, of a spring clip disposed in said slot beneath the tongue and fulcrumed on the end thereof whereby a pressure on the body of the clip will raise its free end away from the periphery of the hub.

4. In a reel, the combination with a hub provided with a slot in its periphery, a pair of fingers projecting transversely across said slot and a spring clip bearing at its ends respectively on the periphery of the hub beyond the slot and consisting of a single strip of metal interlaced around said fingers and adapted to receive pressure between the fingers to raise both ends of the clip.

5. In a reel, the combination with a hub provided with a slot in its periphery, fingers projecting transversely across said slot and a spring clip having its free ends bearing against the periphery of the hub, said clip being bent under said fingers and provided with an upwardly projecting thumb-piece whereby pressure on the thumb-piece will raise the free ends of the clip.

6. In a reel, the combination with a slotted sheet metal hub provided with shoulders at the ends of said slot spaced apart around the periphery thereof, of a spring clip fulcrumed on said shoulders, and consisting of a single strip of sheet metal, means for holding said clip to said hub and a thumb-piece on said clip intermediate the shoulders and adapted on a downward pressure to raise both free ends of the clip.

7. In a reel, the combination with a sheet metal hub or drum provided with a peripheral slot, of a spring clip of sheet metal fulcrumed on the ends of said slot, a pair of fingers extending partially across the slot for holding said clip on the drum and a thumb-piece on said clip between the fingers adapted on a downward pressure to raise the free ends of the clip.

8. In a reel, the combination with a hub or drum provided with a peripheral slot or depression and shoulders at the ends of said slot, of a clip consisting of a continuous piece of spring metal engaging both of said shoulders and passing under a projection intermediate said shoulders whereby a free end of the clip will be held against the surface of the drum by spring action of the metal of the clip itself and downward pressure upon the clip at a point thereof between said shoulders will cause it to fulcrum on a shoulder and raise said free end.

Signed at New York, in the county of New York and State of New York, this 9th day of July, A. D. 1920.

EDWARD FULDA.

Witness:
IRENE LEFKOWITZ.